Figure 1:
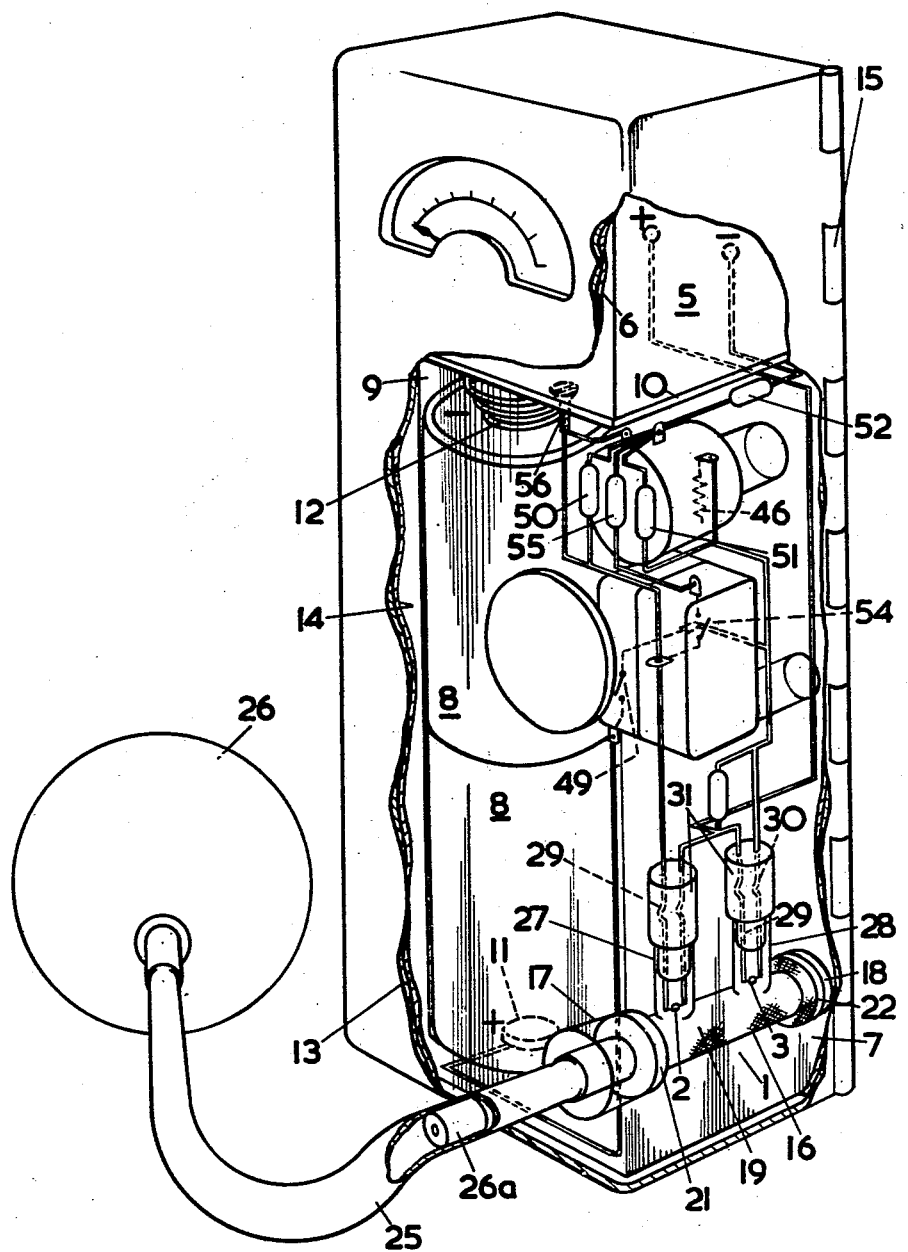

ALAN RICHARD BAKER
Inventor
By Cushman, Darby &
Cushman
Attorneys

Jan. 14, 1964 A. R. BAKER 3,117,843
DETECTION OR ANALYSIS OF GASES
Filed Feb. 3, 1959 4 Sheets-Sheet 2

ALAN RICHARD BAKER
Inventor
By Cushman, Darby & Cushman
Attorneys

Jan. 14, 1964  A. R. BAKER  3,117,843
DETECTION OR ANALYSIS OF GASES
Filed Feb. 3, 1959  4 Sheets-Sheet 3

ALAN RICHARD BAKER
Inventor
By Cushman, Darby &
Cushman
Attorneys

ALAN RICHARD BAKER
*Inventor*
By Cushman, Darby
& Cushman
*Attorneys*

United States Patent Office 3,117,843
Patented Jan. 14, 1964

3,117,843
DETECTION OR ANALYSIS OF GASES
Alan Richard Baker, Sheffield, England, assignor, by mesne assignments, to National Research Development Corporation, London, England
Filed Feb. 3, 1959, Ser. No. 790,870
Claims priority, application Great Britain Feb. 18, 1958
4 Claims. (Cl. 23—254)

This invention relates to a method and apparatus for the analysis of gases and for the detection and quantitative determinations of combustible gases in air, such as for example, the detection of methane in mine atmospheres, of the type in which a pair of metal filaments, which can be heated by the passage of an electric current therethrough, constituting detecting and compensating elements respectively, are arranged in a Wheatstone bridge circuit, the detecting element being heated to a temperature at which the combustible gas is oxidised by catalytic action at the metal surface thereof, whilst the compensating element is conditioned so that the combustible gas will not oxidise on its surface, the effect of any combustible gas present in the sample under test, being to raise the temperature of the detecting filament and hence its resistance so that the normal balance of the bridge circuit is upset and the out-of-balance current passed through an electrical meter or any other suitable indicator or recording or alarm system.

Hitherto in apparatus of the above type, the sample of air to be tested has been brought to the detecting and compensating elements either directly by the flow of the sample, in which case the readings given by the meter have been dependent upon the rate of flow of the gas, or by convection, the strength of the currents of which has varied with the temperatures of the detecting and compensating elements so that the readings given by the meter have depended upon the temperatures of the detecting and compensating elements, and therefore, upon the voltage applied to the bridge.

An object of the present invention is to provide an improved apparatus of the type hereinbefore referred to in which the readings given by the meter are independent of the rate of flow of the sample of gas, of the bridge voltage over a certain range of voltage, and of any variation of the position of the apparatus from the normal upright position.

A further object of the invention is to enable a gas to be analysed by subjecting the detecting and compensating elements to separate gaseous conditions.

In the method of analysing a gas or of detecting combustible gases in air according to this invention, the detecting and compensating elements are housed in chambers or containers in gaseous communication with a supply of gas but are so disposed that they are contacted by said gas circulated thereto by convection currents after diffusion through a virtually stagnant layer of gas.

According to this invention, metal filaments, which can be heated by passing an electric current therethrough, serve respectively as detecting and compensating elements, such elements being housed in chambers or containers communicating respectively with a supply of gas to be analysed and a comparator gas, or both communicating with a supply of air which may contain a combustible gas to be detected. A gauze obturator of fine wire mesh may be interposed between the supplies of gases or air and the chambers whereby the elements are not subjected to the direct flow of gas thereon, but a convection current is set up in each chamber.

Where the apparatus is used for the detection of combustible gases, both filaments may be housed in one chamber with the compensating element disposed at a greater distance from the gauze obturator than the detecting element.

In one form of the apparatus for the detection and quantitative determinations of combustible gases in air of the type hereinbefore referred to, a pair of filaments are arranged in a Wheatstone bridge circuit and constitute the detecting and the compensating elements respectively. These filaments may be disposed in one or a pair of side chambers or tubes arranged radially to and in communication with a main longitudinal passage or tube through which the gas sample under test is caused to flow past the open end or ends of said radial chambers or tubes.

According to a modification the pair of side chambers or tubes may be arranged so as to communicate, through a gauze obturator of fine wire mesh, with the gas to be tested as, for example, in a room or tunnel.

Where the two filaments are each mounted within a separate radial chamber or tube, the said pair of chambers or tubes may be arranged one on each side of the main longitudinal flow passage or tube, either directly opposite one another or longitudinally at a distance apart. Alternatively the said radial chambers or tubes may be longitudinally spaced from one another on one side only of the main flow passage or tube, or they may have any other radial position around the main flow passage or tube either in the same plane or longitudinally spaced along said passage or tube.

When the two filaments are mounted in the same radial chamber or tube, the compensating filament is preferably mounted so as to be positioned deeper inside the said chamber or tube than the detecting filament and therefore at a greater distance from the longitudinal main flow passage or tube than said detecting filament.

Figure 2:
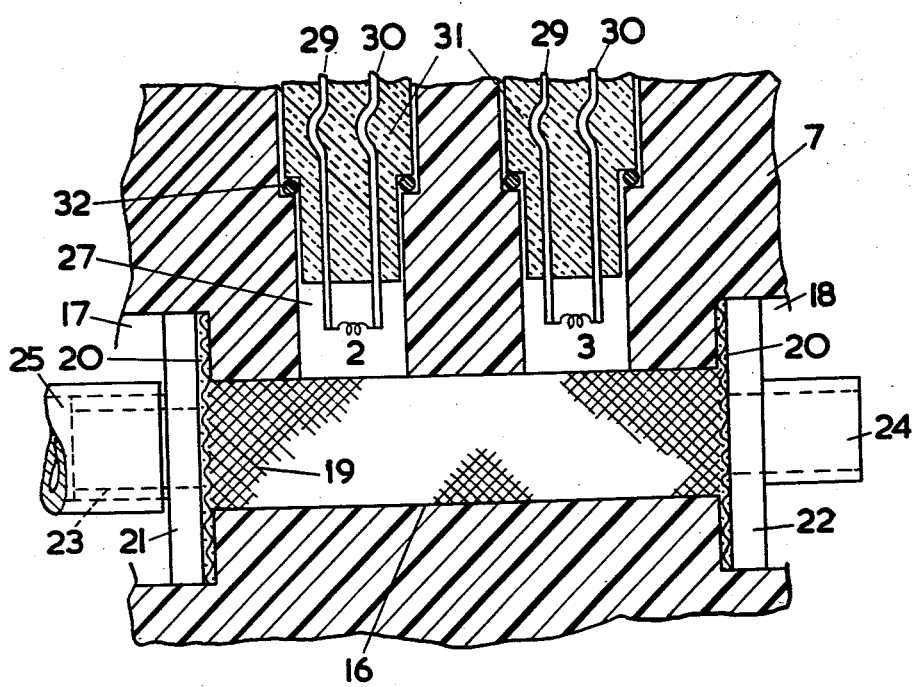
Figure 6:
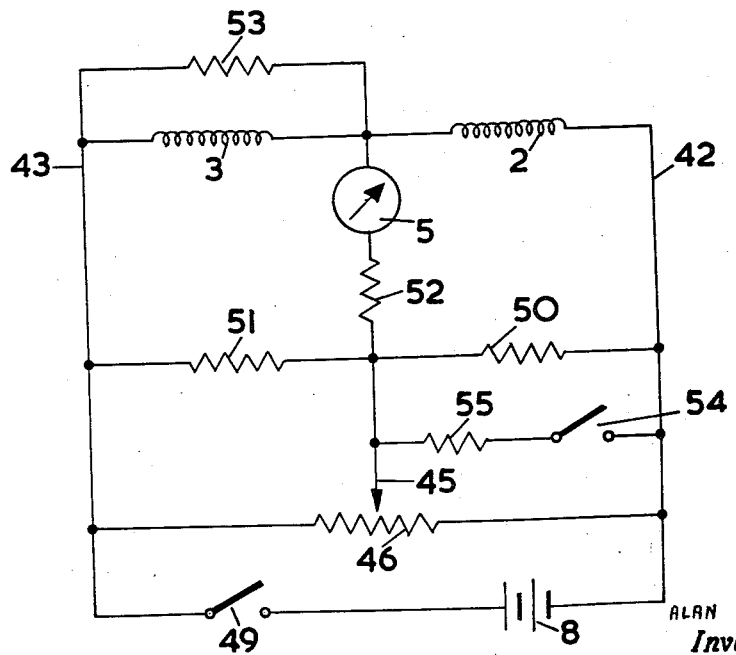
Figure 3:
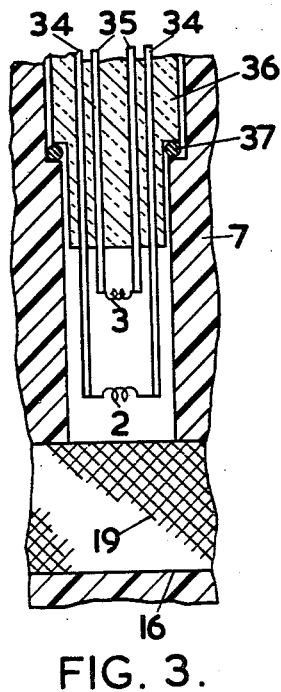
Figure 4:
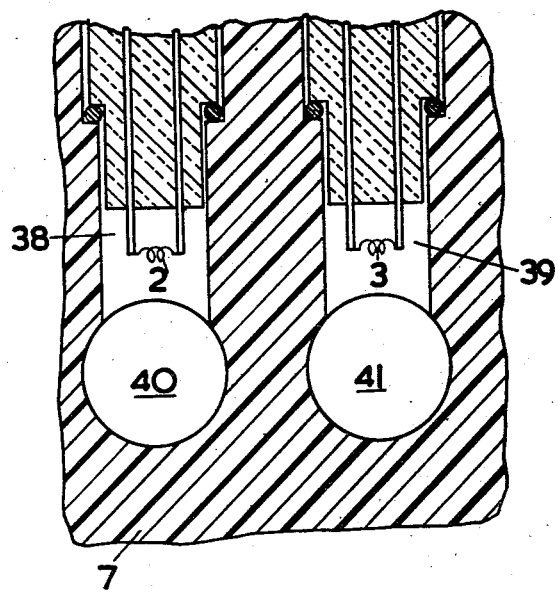
Figure 5:
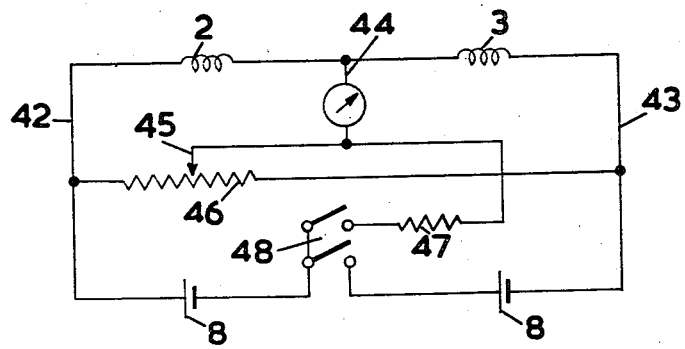
Figure 7:
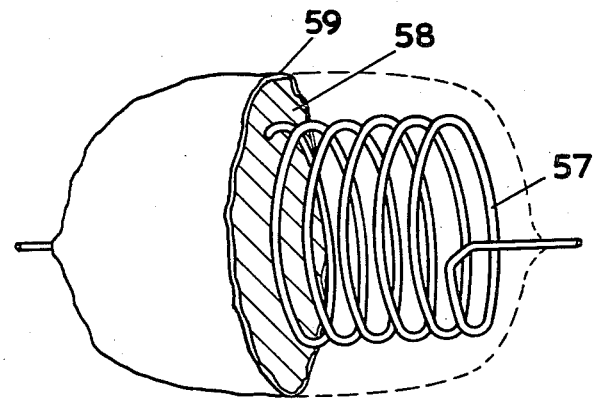

The invention will now be described with reference to the accompanying drawings in which:

FIGURE 1 is a perspective view of one form of apparatus according to the invention, FIGURE 2 is a sectional view of one arrangement of gas flow system as used in FIGURE 1, FIGURE 3 is a view similar to FIGURE 2 of a second arrangement of gas flow system, FIGURE 4 is a sectional view of a third arrangement of gas flow system, FIGURE 5 is a diagram of one form of the electrical circuit incorporated in the apparatus, FIGURE 6 is a diagram of a second form of the electrical circuit incorporated in the apparatus and also shown in FIGURE 1, and FIGURE 7 is an elevational view, partly broken away, of one form of electrically heated filament used in the apparatus.

In carrying the invention into effect according to one example, as will be seen more particularly from FIGURE 1, the main components of the apparatus comprise a gas flow system 1, a detecting element 2 and compensating element 3, both of which elements are positioned within the system 1 and arranged in an electrical circuit in which is also included an electric meter 5. The meter 5 is mounted in a flexible jacket 6 whilst the electrical circuit is embedded in a resin block 7 within which, also, the gas flow system 1 is cast or mounted. One or more replaceable electric batteries 8 are housed within a cylindrical cavity 9 formed in the resin block 7, and retained therein by means of a metal plate 10 secured to the said block, contact with the batteries being made by a metal plug 11 partly embedded in the block 7 at the inner end of the cavity 9, and by a conical spring 12 positioned between the underside of the plate 10 and the top of the batteries 8. The meter jacket 6 and resin block 7 are contained within a metal case 13 lined with foamed rubber sheet 14 or like insulating material, and fitted with a hinged lid 15 secured by an suitable locking means, as for example, by a magnetic lock.

The gas flow system 1 (see FIGURES 1 and 2) consists of a main passage or tube which extends through the lower part of the casing 13 and resin block 7 from front to back thereof and comprises a central portion 16 and end portions 17 and 18 of larger diameter than said central portion. The central portion 16 of the passage of narrower diameter is lined interiorly with a cylinder 19 of metal gauze, which may be of stainless steel, and is covered at each end by discs 20 of similar gauze. A 60 B.S.S. mesh gauze, that is to say, one with apertures 0.0099 inch square has been found suitable where the passage 16 is of a diameter of the order of ⅜ inch. The discs 20 are held in place by the annular flanges 21 and 22 of a pair of connectors 23 and 24 which are cemented into the end portions 17 and 18 respectively of the passage 16. One end of a flexible tube 25 of, for example, rubber, is fitted over the connector 23, the other end of the said tube being provided with a bulb 26 of similar material. When manually pressed and then released, the bub 26 will cause a sample of external gas to be drawn into the passage 16 through the other connector 24 which may open directly to the immediate surrounding atmosphere, or in the case where it is desired to obtain samples of gas from remote or otherwise inaccessible places, may have attached thereto one end of a second flexible tube (not shown) the other end of which may be connected to a metal sampling rod supported from the case 13. A gas flow restriction device 26a may be provided in the tube 25.

Disposed radially to and along the main passage or tube 16 and within the block 7, is a pair of cylindrical chambers or tubes 27 and 28 each of which is open at one end to the passage 16 and closed at its opposite end, the opening of the chambers into the gas passage extending over less than one-half of the cross sectional periphery of the gas passage. Within the chambers or tubes 27 and 28 is mounted the pair of electrically heated filaments 2 and 3 of a metal preferably in the platinum group, the filament 2 constituting the detecting element being disposed within the chamber 27, and the filament 3 constituting the compensating element being disposed within the chamber 28. The filaments 2 and 3 are mounted respectively upon pairs of metal wire supports 29 and 30 which are arranged in the electrical circuit, each pair of supports passing through a plug 31 of insulating material inserted into and forming a closure member at that end of each of the two radial chambers or tubes 27 and 28 remote from the passage 16. Sealing rings 32 may be provided between the plugs and the inner walls of their respective chambers to prevent gas leakage. Preferably the dimensions of the chambers or tubes 27 and 28 remaining open to the passage 16 when the plugs 31 are in position, are approximately the same in all directions. Each chamber is of a given cross sectional area and its opening into the gas passage is of like cross sectional area to provide unrestricted access from the passage to the chamber. Each of the detecting and compensating elements 2 and 3 are mounted near the centre of their respective chambers or tubes so as to be not only offset from the main flow of gas through the passage 16 but also thereby to assist in the reduction of the effects of any variation of the position of the apparatus from the normal upright position. The dimensions of the said chambers or tubes are preferably small. For example, the diameter and length of each of the chambers or tubes 27 and 28 remaining open to the passage 16 may be of the order of 5/16 inch.

The flow of the gas sample in the main passage or tube 16 is broken up into eddy currents in and about the gauze cylinder 19 at the mouths of the pair of radial chambers or tubes 27 and 28 to a very small extent. Aided by these eddy currents, the gas sample then diffuses directly across a single layer of virtually stagnant gas further inside each radial chamber or tube until it reaches the central portions of said chambers where gentle convection currents bring said sample to the surfaces of the detecting and compensating elements. The eddy currents produced in the mouths of the radial chambers or tubes by the flow of the gase sample, and the convection currents inside the said chambers or tubes produced by the hot detecting and compensating elements, are greatly reduced by the damping effect of the walls of the radial chambers or tubes, which, as already stated, are preferably of small dimensions. The gauze cylinder 19 also assists in this damping effect as well as acting as a flame trap.

According to a second embodiment as shown in FIGURE 3, the detecting and compensating filaments 2 and 3, instead of being mounted each in a separate radial chamber or tube, are disposed within the same radial chamber or tube 33, with the detecting filament arranged closer to the metal gauze cylinder or liner 19 of the main gas flow passage or tube 16 than the compensating filament which is placed deeper within the chamber or tube 33 so as to be further from the said gauze cylinder and main flow passage. Each of the filaments may be mounted on a pair of metal wire supports 34 and 35 respectively, which are arranged in the electrical circuit 4 and extend through a common insulating plug 36 inserted into and forming a closure member at that end of the radial chamber or tube 33 remote from the main flow passage 16. A sealing ring 37 may be provided between the plug 36 and the inner wall of the passage or tube 33.

With this arrangement, if the compensating filament should become catalytically active, as for example, after prolonged use especially in high concentrations of combustible gases, or where a too high bridge voltage is applied, the rate at which the combustible gas can reach the said filament is a low one, and the effect on the Wheatstone bridge circuit is small compared with that of the detecting filament.

According to a third embodiment, as shown in FIGURE 4, the detecting and compensating elements 2 and 3 are mounted respectively within separate radial chambers or tubes 38 and 39, the said pair of chambers being arranged each on the side of separate main flow passages or tubes 40 and 41. With this arrangement, the detecting element 2 is exposed to the sample of gas to be tested while the compensating element 3 is exposed to a standard or reference gas such as pure air. For the detection of combustible gases the detecting element may be catalytically active, and for the detection of one non-combustible gas in the presence of another or others, or for the detection of high concentrations of a combustible gas in air, the detecting filament may be catalytically inactive.

Referring now to FIGURE 5, which shows one form of electrical circuit according to the invention, the detecting and compensating elements 2 and 3 are arranged to constitute two arms 42 and 43 of a Wheatstone bridge, and the junction 44 of these two arms is connected to one side of an electric meter such as a galvanometer 5, the other side of which is connected to a slider 45 of a potentiometer rheostat 46 connected across the remote ends of the said arms 42 and 43. These remote ends are also connected to the opposite poles of a source of electrical energy, for example, the battery 8, comprising an even number of cells, the mid-point of which battery is connected to the slider 45 by way of a fixed resistance 47. In order to switch the battery 8 in or out of circuit a two-pole switch 48 or two separate switches is or are included between the two halves of the battery 8 and the fixed resistance 47 of the slider 45, so as not only to interrupt the circuit, but to disconnect the two halves of the battery.

With gas surrounding both filaments, the potentiometer rheostat 46 is used to set the current through the galvanometer 5 to the zero of the scale. The rheostat 46 may have a resistance of 1,000 ohms for filaments with resistances of about 5 ohms. The value of the fixed resistance 47 determines the sensitivity of the circuit for a given change in the resistance of the detecting filament and may have a resistance of 10 ohms or less. This arrangement allows a finer and wider control by the potentiometer, requires less current and allows the sensitivity of the apparatus to be set to a desired value by the selection of one fixed resistance.

The above described circuit is intended mainly for use where the apparatus is to remain stationary at predetermined fixed positions and where it could be used in conjunction with alarms or recorders operating from large storage batteries or a mains supply (i.e., two tappings on a transformer).

In the case where the apparatus is intended to be portable, as for example, as shown in FIGURE 1, it is preferred to use the modified electrical circuit shown in FIGURE 6. In this circuit the detecting and compensating elements 2 and 3 are arranged, as in the previous example, to constitute the two arms 42 and 43 of the Wheatstone bridge, whilst, as before, the junction 44 of these two arms is connected to one side of the galvanometer 5, the other side of which is connected to the slider 45 of the potentiometer rheostat 46 connected across the remote ends of the said arms 42 and 43. In this case these remote ends are connected to the opposite poles of the battery 8 through a micro-switch 49. Also, whereas in the previous embodiment the two parts of the potentiometer rheostat 46 alone constitute the third and fourth arms of the bridge, according to the modified circuit, the said third and fourth arms are constituted by the two parts of the said rheostat shunted by a pair of resistances 50 and 51 connected respectively between the slider 45 and the opposite ends of the potentiometer rheostat winding 46. At the same time a calibrating resistance 52 may be provided in the connection between the galvanometer 5 and the slider 45. The resistance of the rheostat 46 may be of the order of 250 to 1,000 ohms, and that of the pair of resistances 50 and 51 and the calibrating resistance 52, 20 to 30 and 0 to 10 ohms respectively.

For the purposes of fine adjustment, a resistance 53, constructed of material with a temperature co-efficient of resistance different from that of the detecting or compensating filaments may be connected in series or parallel with one or other of said filaments, as appropriate. When the value of this resistance is correctly adjusted at the mean operating bridge voltage, a variation of the bridge voltage, such as may occur when batteries are used and their voltage falls with use, does not affect the out-of-balance current. For this purpose it is convenient to use resistances of Nichrome or other similar metal whose temperature co-efficient is effectively zero. A second micro-switch 54 controlling a selected resistance 55 may be provided across one arm of the bridge for the purpose of periodically checking the voltage being applied by the battery 8 to the bridge circuit.

The circuit just described is shown incorporated in the example of the apparatus illustrated in FIGURE 1, from which it will be seen that electrical connection is made to the circuit from the top or negative pole of the battery 8 through the spring 12 and battery retaining plate 10, and thence by way of one of the screw bolts 56, which secure said plate within the resin block 7, and wiring, to the potentiometer rheostat 46, resistance 50, micro-switch 54 and detecting element 2. On the other hand, the electrical connection to the circuit is made between the bottom or positive pole of the battery and the micro-switch 49, through the metal plug 11.

Whilst the detecting and compensating elements 2 and 3 as used in the above described embodiments of the invention may be constituted by exposed filaments of helically coiled wire, it is preferred to embed one or other or both of such filaments in a coating or pellet of the kind described in my co-pending application Serial No. 790,-935, and an example of which is illustrated in FIGURE 7. As will be seen from this figure, a helically wound wire metal coil 57 constituting the filament is embedded within or completely surrounded by an oxide or other refractory materials such as alumina or silica, so as to form a coating or pellet 58. The filaments, which may be of platinum, act as heaters and resistance thermometers, and the combustible gas sample is oxidised by a catalyst coating 59 formed on the outer surface of one of the coatings or pellets constituting the detecting element, whilst the other coating or pellet, which has no catalyst coating, acts as the compensating element.

Where the two filaments constituting the detecting and compensating elements are of a metal in the platinum group, the detecting filament may be directly exposed to the combustible gas, whilst the compensating filament may be treated with a silicone fluid in such a way as to prevent the oxidation of the combustible gases. The silicone may be applied to the compensating filament either as a vapour or in solution. For example, hexamethyldisiloxane vapour can be passed over the heated filament, or a solution of an alkyl siloxane in an organic solvent can be placed on the compensating filament, evaporated to dryness, and finally heated to 1,000° C. Alternatively the compensating filament may be coated with or alloyed with a metal such as gold in such a way as to prevent oxidation. On the other hand, the compensating filament, instead of being treated with a silicone fluid or alloyed with a metal such as will prevent oxidation, may be embedded in a coating or pellet of the kind already referred to, in order to obtain the same result. Further, the coating or pellet may itself be treated with a silicone fluid or a suitable metallic oxide such as chromium oxide. Whether treated with a silicone, or alloyed with a metal such as will prevent oxidation, or embedded in a coating or pellet, the compensating filament has the advantage of reliably operating at a temperature as high or nearly as high as that of the detecting filament so that the said compensating filament can give more exact compensation for changes in humidity, pressure, heating current and so on.

I claim:

1. In a gas analyzing apparatus having a detecting resistance element and a compensating resistance element both of which elements are exposed to the same conditions, means having a wall defining a conduit forming an elongated gas passage, a pair of identical chambers joined to said gas passage and open at one end only, the open end of said chambers being positioned at the junction of the gas passage and said chambers to permit direct communication between said gas passage and said chambers, one of said chambers housing the detecting element and the other chamber housing said compensating element, said chambers being of a given cross sectional area and the opening thereof being of like cross sectional area, a screen member at the junction of said gas passage and said chambers, said screen member extending across the opening of said chambers as a projection of said wall to create in said chambers a single stagnant gas layer in which said resistance elements are positioned.

2. Apparatus as claimed in claim 1, in which the detecting resistance element comprises a metal filament which constitutes both a heater and a resistance thermometer, and a refractory materal enveloping said metal filament.

3. Apparatus as in claim 1 wherein the gas passage is cylindrical, the chamber is cylindrical, the axes of the cylinders intersect at right angles, and the diameter of the chamber is less than the diameter of the passage.

4. Apparatus as in claim 3 wherein the length of the chamber is approximately equal to its diameter, and the measuring element is approximately centered with the chamber.

References Cited in the file of this patent

UNITED STATES PATENTS

| | | |
|---|---|---|
| 1,918,702 | Hebler et al. | July 18, 1933 |
| 1,971,038 | Hamilton | Aug. 21, 1934 |
| 2,335,032 | Sullivan | Nov. 23, 1943 |
| 2,546,273 | Poole | Mar. 27, 1951 |
| 2,585,959 | Minter | Feb. 19, 1952 |
| 2,618,150 | Willenborg | Nov. 18, 1952 |
| 2,652,315 | McEvoy | Sept. 15, 1953 |
| 2,687,036 | Minter | Aug. 24, 1954 |
| 2,743,167 | Cherry | Apr. 24, 1956 |
| 2,768,069 | Thompson | Oct. 23, 1956 |
| 2,888,330 | Kapff | May 26, 1959 |
| 2,899,281 | Olmer | Aug. 11, 1959 |
| 2,901,329 | Kapff | Aug. 25, 1959 |